This invention relates to a process for polymerizing propylene to high conversions and to the resulting novel form of polypropylene. In one aspect, it relates to the production of large discrete platelets of free-flowing polypropylene. In another particular aspect, it relates to a method for polymerizing propylene without the formation of polymer deposits in the process equipment during polymerization.

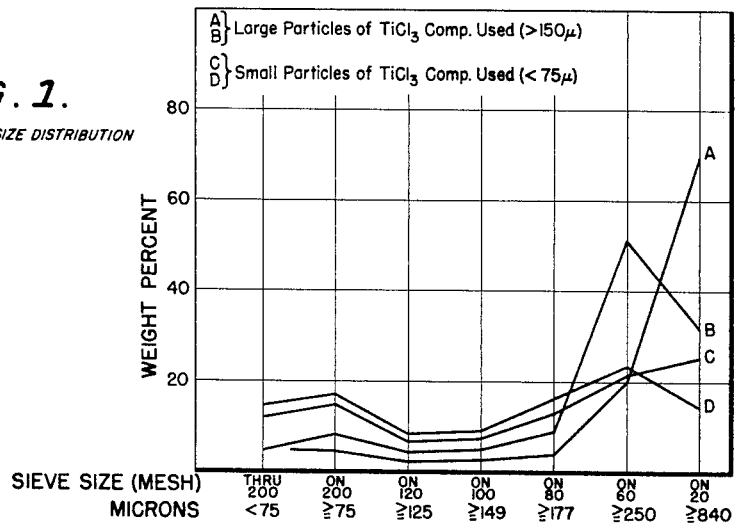
FIG.1. POLYMER PARTICLE SIZE DISTRIBUTION
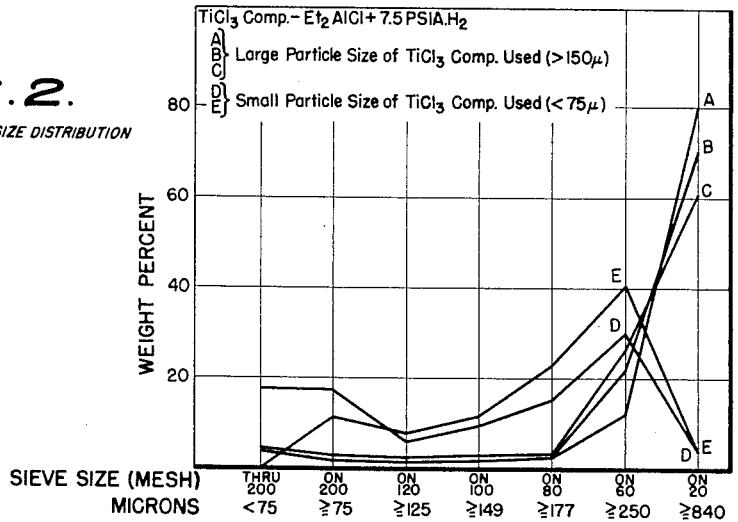
FIG.2. POLYMER PARTICLE SIZE DISTRIBUTION
D. F. HOEG
A. B. STRYKER
INVENTORS 3,168,506
PROCESS FOR POLYMERIZING PROPYLENE
WHEREIN THE TITANIUM HALIDE PARTI-
CLE SIZE IS AT LEAST 150 MICRONS
Donald F. Hoeg, Rockville, and Abner Bartlett
Stryker, Jr., West Severna Park, Md., assignors to
W. R. Grace & Co., New York, N.Y., a corpora-
tion of Connecticut
Filed July 6, 1961, Ser. No. 122,233
6 Claims. (Cl. 260—93.7)

It is well known that propylene can be polymerized to relatively high molecular weight solid polymer by subjecting the monomer in liquid form to a catalyst comprised of titanium trichloride and an activator such as diethyl aluminum chloride.

This polymerization process is normally carried out as a batch operation but a continuous operation can be used. Anhydrous and oxygen-free conditions must be maintained throughout the polymerization since the catalyst is deactivated with water or oxygen.

Unfortunately, the polymer product is usually produced in a form such that the apparatus used for polymerization becomes fouled therewith. A portion of the product obtained with the aforementioned catalyst system exhibits a crystalline structure by X-ray analysis. This crystalline portion of the polymer is particularly difficult to remove from the surfaces of the reactor because it is substantially insoluble in the usual hydrocarbon solvents, such as the paraffins, including for example, the pentanes, hexanes, octanes, decanes, and the like, and is also insoluble in oxygen-containing organic solvents such as aldehydes and ketones.

The ensuing polymer deposition on the reactor surfaces is largely objectionable because it reduces the capacity of the reactor and results in inefficient plant utilization. It also interferes with proper heat transfer, may cause plugging of the reactor or otherwise impair the control of the polymerization reaction, thereby producing inferior or non-uniform polymer.

Because this polymeric deposition has a low degree of solubility in readily available solvents, it has heretofore been removed largely by scraping, burning or sand blasting the coated surfaces. These methods of cleaning the deposition from the equipment surfaces are impractical due to the abnormally rapid wear and high replacement cost of equipment so treated.

It is an object of the present invention to provide an improved polymerization process and product whereby high conversions to substantially free-flowing polymer are obtained with little or no deposit of polymer product on the reactor surfaces.

In summary, this invention is directed to polymerizing liquid propylene under an inert atmosphere at a polymerization temperature in the range of 20 to 90° C., and a pressure in the range 150 to 690 p.s.i.a. in the presence of a catalyst comprised of a $TiCl_3$ composition and diethyl aluminum chloride, said $TiCl_3$ composition having the formula $3TiCl_3 \cdot AlCl_3$, and said $TiCl_3$ composition having a particle size of about 150 microns and larger.

The $TiCl_3$ composition, $3TiCl_3 \cdot AlCl_3$, is a well-known material of commerce, and may be prepared, for example, by the well-known high temperature reduction of $TiCl_4$ with aluminum, i.e., $3TiCl_4 + Al \rightarrow 3TiCl_3 + AlCl_3$. When prepared in this way, the material is a homogeneous mixture of $TiCl_3$ and $AlCl_3$ in the mole ratio of 3:1.

Conversions as high as 98% have been attained by the practice of this invention. As a result, monomer recycle requirements are decreased thus producing a greater product yield for a given size of equipment than methods heretofore employed. Due to the relative cleanness of the reactor surfaces, there is comparatively little interference with heat transfer and increased control of the polymerization reaction is possible.

The polymer produced by the invention is comprised of free-flowing, discrete, flat platelets about 5 to 10 mm. in size on the average. These polymer particles are crystalline to X-rays and have an apparent density as high as 0.895 g./cc. as measured in a density gradient column at 25° C.

The polymerization temperature may be in the range of about 20° to 90° C., although temperatures between about 50° and 80° C. are preferred. The preferred pressure is substantially the vapor pressure of liquid propylene at the particular polymerization temperature. Higher pressures up to 5000 p.s.i.a. or pressures to any value can be used if desired. A mole ratio of the diethyl aluminum chloride to the $TiCl_3$ composition of about 2 to 4:1 is preferred, although ratios as high as 1 to 8:1 are suitable.

For a better understanding the invention will now be illustrated by actual operating examples.

EXAMPLE I

*Preparation of catalyst*

The $TiCl_3$ composition was obtained commercially and had an actual composition of 77.68% $TiCl_3$ and 22.32% $AlCl_3$. This composition had been ball-milled by the manufacturer and had particles as large as $250\mu$ and larger, and an average particle size of about 15 to $50\mu$. The $TiCl_3$ composition was placed on the top pan of a set of sieves in a dry box under an inert atmosphere of argon and the entire set of sieves was mechanically shaken for ½ to ¾ of an hour. Two steel balls were placed on each pan to aid the operation. Some runs were made using the large size particles ($>150\mu$), and other runs were made using the small size particles ($<75\mu$).

EXAMPLE I-A

*Polymerization of propylene*

The reactor was a 1 liter stainless steel pressure reactor equipped with a mechanical stirrer and means for introducing the reaction components. In this run (as well as in the other runs tabulated) 0.52 grams of the particular size $TiCl_3$ composition was added to the reactor under a blanket of nitrogen. The reactor contained 1 atmosphere of nitrogen. 200 grams of liquid propylene was then added and the reactor was heated to the reaction temperature of about 64° C. The pressure in the reactor was substantially the pressure of liquid propylene at about 64° C., i.e., about 380–400 p.s.i.g. 2.13 ml. of a solution of diethyl aluminum chloride and hexane containing 3.33 millimoles of diethyl aluminum chloride per milliliter of hexane was blown into the reactor. The amount of diethyl aluminum chloride used was based on a 2:1 mole ratio of diethyl aluminum chloride to the TiCl₃ composition. At the end of one hour the unreacted monomer was vented to the hood and the reactor cooled and opened. The entire reactor product was recovered and allowed to stand exposed to to air. The yield was 113 grams.

In certain runs (see tables below) hydrogen was added before the propylene to reduce the molecular weight of the product. 7½ p.s.i.a. hydrogen was used, although as much as 100 p.s.i.a. or higher can be used if desired. In these runs, the same general result was obtained with the large size particles (>150μ) of the TiCl₃ composition, i.e., large, discrete platelets of free-flowing polymer were produced with almost no film forming on the reactor surfaces. When hydrogen was used with the small size particles (<75μ) of the TiCl₃ composition, a fine talcum-like product was still produced, but surprisingly, very little film formed on the reactor surfaces.

After weighing, the polymer was placed on the top pan of a set of sieves and the entire set was mechanically shaken for ½ to ¾ of an hour. Two steel balls were placed on each pan to aid the operation. Each fraction was then weighed, and its reduced specific viscosity (RSV) determined by dissolving 0.1 gram of product in 100 cc. Decalin at 135° C.

The isotacticity of each polymer fraction was determined by measuring the insolubility of the polymer in boiling heptane. In each case the insoluble high-molecular-weight isotactic polypropylene was recovered and found to be a certain percent by weight of the unextracted polymer.

The experimental results are tabulated in Tables I, II and III. The formula for determining catalyst activity is grams of polymer/grams of TiCl₃ composition/hour.

In Table I, where large particle size TiCl₃ composition (>150μ) was used, polymer particles in all size distributions were hard, discrete platelets, free-flowing with no apparent inter-particle fusion. Almost no film was present on the reactor surfaces.

In Table II, where small particle size TiCl₃ composition (<75μ) was used, the resulting polymer was fine talcum-like in appearance. In those runs where hydrogen was not used, a large amount of film formed on the reactor surfaces, but in those runs where hydrogen was used, very little film formed on the reactor surfaces.

In Table III, the results are shown for a run using unfractionated catalyst and a run using medium particle size catalyst (>75 <150μ) with hydrogen. In the run using unfractionated catalyst, mostly fine particle size polymer was produced with a large amount of film forming on the reactor surfaces. In the run using medium particle size catalyst and hydrogen, a large amount of small particle size polymer was produced with little film forming on the reactor surfaces.

All the runs listed in Tables I and II are graphically illustrated in FIGURES 1 and 2. Each of these runs is numbered to correspond to its graph, for example, run 1–A is found in FIGURE 1 at A.

In general, over 80% of the polymer particles produced by the large particle size TiCl₃ composition (>150μ) were larger than 60 mesh (250μ). The small particle size TiCl₃ composition (>75μ) formed mostly fine particle size polymer and less than 30% of the polymer was larger than 60 mesh (250μ). Almost all of the polymer formed with the fine particle size TiCl₃ composition where hydrogen was not used, and which was classified as the "on 20" fraction, consisted of film scraped from the reactor walls, stirring blade and shaft.

The polypropylene product of this invention may be purified and recovered by techniques well-known in the art. For example, the crude polymer may be washed with an alcohol such as methanol. There is no apparent change in the appearance of the polymer after such purification.

The high bulk density particles of this invention have obviously good processability characteristics. They are in a commercially usable form as produced, whereas finely divided polymer particles pack easily and must usually be molded and pelletized before use.

The uses of the polypropylene of this invention are analogous to those prepared by prior art procedures. The solid polymer can be used to make molds, film, filament, piping, tubing, and the like, using substantially the same equipment and techniques customary for the solid polypropylene of the prior art.

TABLE I.—POLYMER PARTICLE SIZE DISTRIBUTION AND PROPERTIES

[Obtained with large particle size TiCl₃ composition (>150μ)]

| Run | Percent Conversion | Yield, g. | Activity | H₂ (p.s.i.a.) | Mesh Size | On 20 | On 60 | On 80 | On 100 | On 120 | On 200 | Thru 200 |
|---|---|---|---|---|---|---|---|---|---|---|---|---|
| | | | | | Particle Size | (≧840μ) | (≧250μ) | (≧177μ) | (≧149μ) | (≧125μ) | (≧75μ) | (<75μ) |
| 1A | 56.5 | 113 | 216 | 0 | Weight (g.) | 77.6 | 21.4 | 2.1 | 1.3 | 1.0 | 3.5 | 4.4 |
| | | | | | Percent Heptane Insol | 96.6 | 96.5 | 96.1 | 95.9 | 95.6 | 95.9 | 94.7 |
| | | | | | RSV | | 12.3 | | 12.4 | 12.4 | 12.9 | 12.5 |
| 1B | 66 | 132 | 252 | 0 | Weight (g.) | 39.4 | 59.9 | 9.5 | 3.2 | 2.9 | 9.8 | 4.4 |
| | | | | | Percent Heptane Insol | 96.3 | 96.4 | 96.2 | 96.4 | 96.4 | 96.1 | 95.7 |
| | | | | | RSV | 15.2 | 15.1 | 17.0 | 17.2 | 16.6 | 16.7 | 16.8 |
| 2A | 70.5 | 141 | 271 | 7.5 | Weight (g.) | 112.8 | 16.0 | 1.6 | 0.9 | 0.7 | 2.2 | 3.5 |
| | | | | | Percent Heptane Insol | 95.6 | 95.1 | | | | 93.3 | |
| | | | | | RSV | 3.5 | | 3.5 | | | 3.7 | 3.7 |
| 2B | 42.5 | 85 | 163 | 7.5 | Weight (g.) | 63.1 | 18.7 | 0.9 | 0.5 | 0.4 | 0.6 | 0.6 |
| | | | | | Percent Heptane Insol | 95.6 | 95.4 | | | | | |
| | | | | | RSV | 3.0 | | 3.1 | | | | 3.0 |
| 2C | 98.5 | 197 | 379 | 7.5 | Weight (g.) | 121.4 | 49.8 | 4.0 | 2.0 | 1.3 | 3.1 | 5.8 |
| | | | | | Percent Heptane Insol | 93.4 | 93.2 | | | | | 89.1 |
| | | | | | RSV | 1.9 | | 2.2 | | 2.1 | | 1.9 |

TABLE II.—POLYMER PARTICLE SIZE DISTRIBUTION AND PROPERTIES

[Obtained with small particle size TiCl₃ composition (<75μ)]

| Run | Percent Conversion | Yield, g. | Activity | H₂ (p.s.i.a.) | Mesh Size / Particle Size | On 20 ($\geq 840\mu$) | On 60 ($\geq 250\mu$) | On 80 ($\geq 177\mu$) | On 100 ($\geq 149\mu$) | On 120 ($\geq 125\mu$) | On 200 ($\geq 75\mu$) | Thru 200 ($<75\mu$) |
|---|---|---|---|---|---|---|---|---|---|---|---|---|
| 1C | 60.5 | 121 | 235 | 0 | Weight (g.) | a 29.3 | 24.3 | 13.4 | 7.2 | 6.8 | 18.0 | 15.9 |
|  |  |  |  |  | Percent Heptane Insol | 91.1 | 94.7 | 94.5 | 94.6 | 93.9 | 94.0 | 93.6 |
|  |  |  |  |  | RSV | 14.2 | 15.0 |  |  | 14.8 |  |  |
| 1D | 51.0 | 102 | 195 | 0 | Weight (g.) | a 13.0 | 22.8 | 15.0 | 7.8 | 7.4 | 17.3 | 13.8 |
|  |  |  |  |  | Percent Heptane Insol | 94.0 | 95.9 | 95.4 | 95.6 | 95.3 | 95.2 | 94.6 |
|  |  |  |  |  | RSV |  | 15.4 |  | 16.3 | 17.3 | 16.0 | 15.3 |
| 2D | 47.5 | 95 | 180 | 7.5 | Weight (g.) | 3.0 | 29.0 | 13.3 | 8.7 | 5.4 | 15.7 | 16.0 |
|  |  |  |  |  | Percent Heptane Insol |  | 94.3 |  | 93.6 |  | 93.6 |  |
|  |  |  |  |  | RSV | 2.4 |  | Gel |  | 2.4 |  | 2.4 |
| 2E | 29.5 | 59 | 110 | 7.5 | Weight (g.) | 0.8 | 23.8 | 12.7 | 6.8 | 4.1 | 6.7 | 1.9 |
|  |  |  |  |  | Percent Heptane Insol |  | 90.5 | 91.1 |  |  | 89.8 |  |
|  |  |  |  |  | RSV |  |  | 4.0 |  |  |  |  | a Film was segregated in this fraction.

TABLE III.—POLYMER PARTICLE SIZE DISTRIBUTION AND PROPERTIES

[Obtained with medium particle size and unfractionated TiCl₃ composition]

| Run | Percent Conversion | Yield, g. | Activity | H₂ (p.s.i.a.) | Mesh Size / Particle Size | On 20 ($\geq 840\mu$) | On 60 ($\geq 250\mu$) | On 80 ($\geq 177\mu$) | On 100 ($\geq 149\mu$) | On 120 ($\geq 125\mu$) | On 200 ($\geq 75\mu$) | Thru 200 ($<75\mu$) |
|---|---|---|---|---|---|---|---|---|---|---|---|---|
| >75μ, <150μ | 86.5 | 173 | 336 | 7.5 | Weight (g.) | 24.4 | 98.9 | 10.3 | 5.2 | 4.2 | 11.0 | 14.7 |
|  |  |  |  |  | Percent Heptane Insol | 92.0 | 91.8 | 90.9 |  |  |  | 89.9 |
|  |  |  |  |  | RSV | 2.2 |  | 2.3 |  | 2.4 |  | 2.6 |
| Unfractionated | 81.0 | 162 | 311 | 0 | Weight (g.) | a 5.7 | 15.6 | 12.6 | 7.8 | 6.6 | 17.1 | 17.2 |
|  |  |  |  |  | Percent Heptane Insol |  | 95.5 | 96.1 | 96.5 | 96.2 | 96.1 | 96.2 |
|  |  |  |  |  | RSV | 23.0 | 20.2 | 20.3 | 20.4 |  | 21.0 |  | a Film was segregated in this fraction.

We claim:
1. In the process which comprises polymerizing liquid propylene to a normally solid polymer in a polymerization zone at a temperature in the range 20 to 90° C., and a pressure in the range 150 to 690 p.s.i.a., in the presence of a catalyst consisting essentially of a TiCl₃ composition and diethyl aluminum chloride, said TiCl₃ composition having the formula 3TiCl₃·AlCl₃, the improvement in which the said TiCl₃ composition has a particle size of at least about 150 microns with exclusion of particles of a size less than 150 microns, whereby large discrete platelets of polymer are produced and fouling in said zone is substantially eliminated.

2. The process according to claim 1 wherein the mole ratio of diethyl aluminum chloride to the TiCl₃ composition is 1–8:1.

3. The process according to claim 2 wherein the mole ratio of diethyl aluminum chloride to the TiCl₃ composition is 2:1.

4. The process according to claim 3 wherein the polymerization temperature is about 65° C. and the pressure is about 380 to 400 p.s.i.g.

5. The process according to claim 4 wherein about 7 to 100 p.s.i.a. of hydrogen is added to the polymerization zone.

6. A process for substantially eliminating the fouling effects and obtaining high conversions in the polymerization of liquid propylene under an inert atmosphere, at a polymerization temperature in the range 20 to 90° C., and a pressure in the range 150 to 690 p.s.i.a., in the presence of a catalyst comprised of a TiCl₃ composition and diethyl aluminum chloride, said TiCl₃ composition having the formula 2TiCl₃·AlCl₃, the improvement in which the said TiCl₃ composition has a particle size of at least 150 microns with exclusion of particles of a size less than 150 microns.

References Cited in the file of this patent

UNITED STATES PATENTS 3,010,952    Lovett et al.    Nov. 28, 1961

UNITED STATES PATENT OFFICE
CERTIFICATE OF CORRECTION

Patent No. 3,168,506 February 2, 1965

Donald F. Hoeg et al.

It is hereby certified that error appears in the above numbered patent requiring correction and that the said Letters Patent should read as corrected below.

Columns 5 and 6, TABLE III, first column heading, for "Run" read -- Catalyst Size --.

Signed and sealed this 22nd day of June 1965.

(SEAL)
Attest:

ERNEST W. SWIDER
Attesting Officer

EDWARD J. BRENNER
Commissioner of Patents